United States Patent
Wagner

(10) Patent No.: US 6,419,039 B1
(45) Date of Patent: Jul. 16, 2002

(54) MOTORCYCLE CRASH BAR AND SADDLEBAG PROTECTOR GUARD

(76) Inventor: Robert L. Wagner, 16826 87th La. North, Loxahathee, FL (US) 33470

( * ) Notice: Subject to any disclaimer, the term of this patent is extended or adjusted under 35 U.S.C. 154(b) by 0 days.

(21) Appl. No.: 09/983,842

(22) Filed: Oct. 26, 2001

(51) Int. Cl.[7] ............................................. B62J 23/00
(52) U.S. Cl. ................. 180/219; 280/304.3; 280/770; 280/850; 74/608; D12/117; D12/126
(58) Field of Search ...................... 180/219; 280/228.4, 280/304.3, 770, 152.3, 848, 850; 296/78.1; 264/DIG. 60, 219, 239; 74/558.5, 608; 427/154; D12/186, 115, 119, 117, 126, 107

(56) References Cited

U.S. PATENT DOCUMENTS

| | | | | | |
|---|---|---|---|---|---|
| 629,667 | A | * | 7/1899 | Denbigh | 280/304.3 |
| 2,773,398 | A | * | 12/1956 | Swain | 280/304.3 |
| 4,105,220 | A | * | 8/1978 | Pacific | 280/304.4 |
| 4,136,890 | A | * | 1/1979 | Vertucci | 296/78.1 |
| 4,138,132 | A | * | 2/1979 | Doyle | 264/163 |
| 4,403,787 | A | * | 9/1983 | Shimano | 280/304.3 |
| 4,878,558 | A | * | 11/1989 | Asakura | 180/219 |
| D313,774 | S | * | 1/1991 | Hauer | D12/126 |
| 5,106,136 | A | * | 4/1992 | Crain | 280/304.3 |
| 5,183,281 | A | * | 2/1993 | Stephens | 280/279 |
| 5,397,146 | A | * | 3/1995 | Fischer | 280/288.4 |
| D388,026 | S | * | 12/1997 | DeFur | D12/114 |
| 6,234,266 | B1 | * | 5/2001 | Saiki | 180/219 |
| D444,104 | S | * | 6/2001 | Baker | D12/126 |
| D445,532 | S | * | 7/2001 | Larson | D26/126 |

* cited by examiner

Primary Examiner—Robert P. Olszewski
Assistant Examiner—F. Zeender
(74) Attorney, Agent, or Firm—C. J. Husar Esq.

(57) ABSTRACT

The disclosure relates to an inexpensive plastic protective guard that is securely attached to the crash bars and/or saddlebag protectors of a motorcycle or motorbike to protect the chrome finish thereon. The protective guard is comprised of a hollow pre-molded impact resistant plastic component which conforms to the shape of the crash bar or protective bar. The protective guard includes a longitudinal slit through its wall to allow opening of the guard and placed thereover where it securely snaps into place and serves to protect the chrome finish on these components in the event of a crash, dropping or scrape when these components come into contact with the pavement.

9 Claims, 1 Drawing Sheet

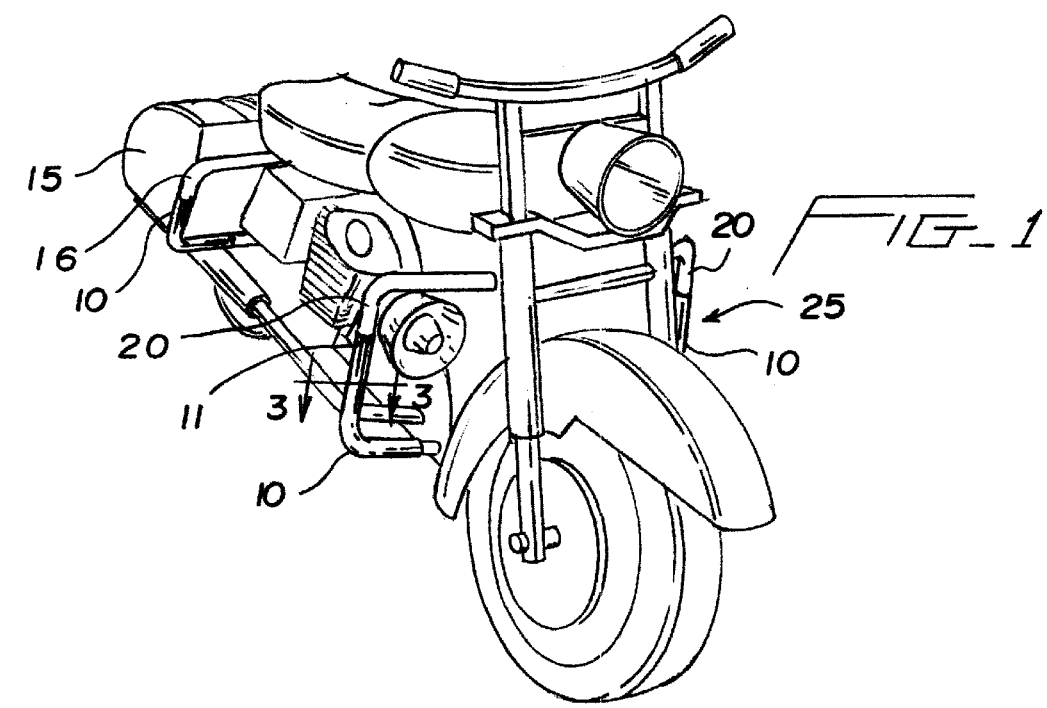
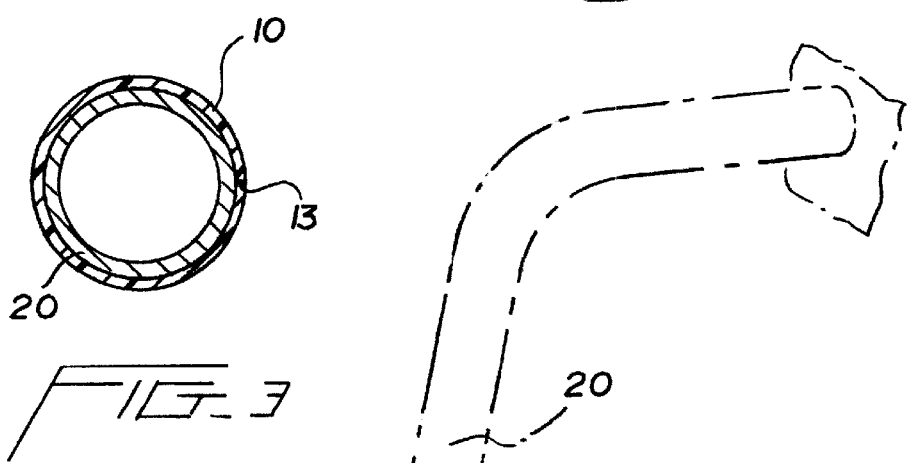
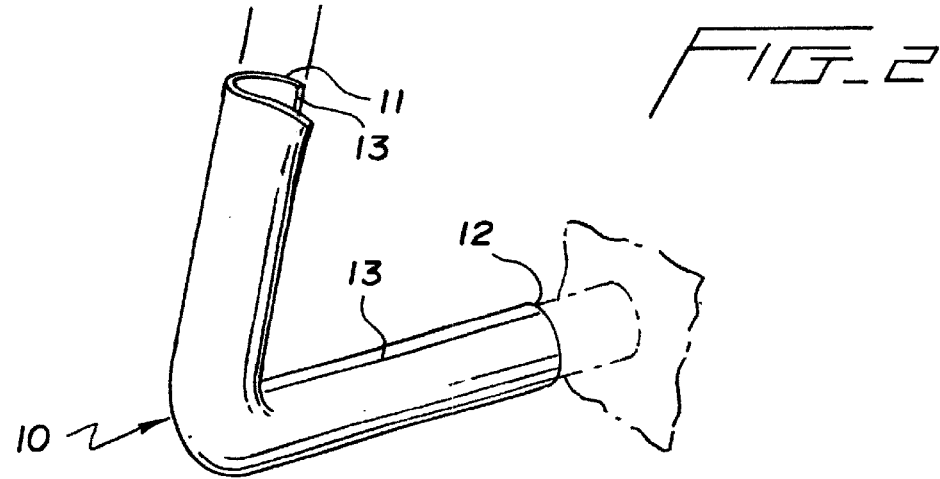

MOTORCYCLE CRASH BAR AND SADDLEBAG PROTECTOR GUARD

BACKGROUND OF THE INVENTION

The present invention relates to a protective device for motorcycles and/or motorbikes. More specifically, it relates to a removable protective guard which can be readily installed and removed without the requirement for any tools in the procedure. Motorcycling and motorbiking has become a very popular sporting activity which is growing in numbers by leaps and bounds. We have all experienced the display of bike enthusiasts on weekends participating in rallies motoring about the countryside as well as individuals out there enjoying the peace and tranquility of our beautiful country and its varied landscape.

Motorcyclists are well known for the pride they take in the appearance of their "bikes" or "motors" as they are affectionately referred to and there is nothing more pleasing to one's eyes than the sight of a bike which is glistening in the sun with all its chrome and painted surfaces reflecting the sun's rays as it whizzes down the highway. Hours upon hours are devoted to ensuring that these bikes are maintained spotless and free of rust or corrosion. As can be expected, these bikes are provided with various types of equipment such as crash bars and saddlebag protectors that serve to protect the bike in the event that the bike is inadvertently dropped or falls over on its side. These crash bars and saddlebag protectors consist of steel tubular members which are chrome plated and securely attached to the frame of the bike.

The subject invention relates to a protective guard that is placed over the crash bars and/or also the rear saddlebag protective bars to reduce the possibility of scratching the chrome surfaces during a fall or drop of the bike. If these chrome plated surfaces are scratched and the chrome plating is removed, it exposes the steel tubing thereunder to the atmosphere with resulting rusting in these areas due to oxidation. Correcting this problem requires either new components or removal of the damaged component and re-chroming, either of which is a time consuming and expensive procedure.

With the above information in mind, applicant has developed a protective guard that is made of highly durable, impact resistant plastic and is pre-molded to conform to the shape and size of the particular bike for both the crash bars and saddlebag protectors. The protective guard has an internal diameter corresponding to the outer diameter of the particular component to be protected and includes a slit through the inward facing wall extending for the full length, thus allowing the guard to be separated at the top and with a slight amount of pressure forced over the crash bar and is securely retained thereon by the resiliency of the guard as it returns to its original shape. Removal of the protective guard is just as easy, either end is separated at the slit and pulled outward, thus releasing the guard from the crash bar or saddlebag when so desired.

The invention finds particular use in the law enforcement field, at the Federal, State and local levels where each of these jurisdictions maintain motorcycle units that vary in size depending upon the areas being served by these units. These law enforcement units engage in complex training exercises on a regular basis which include tortuous tracks, simulated emergency "drop and run" exercises and other biking skill improving procedures. During these practice sessions, bikes are frequently dropped inadvertently, and on some occasions intentionally, with resulting scratching of the chrome crash bars and saddlebag protectors. Additionally, the invention finds extensive use with the motorcycling and motorbiking public which is steadily increasing in number as pointed out above.

SUMMARY OF THE INVENTION

According to the present invention, protective guards are provided for motorcycle and motorbike crash bars and saddlebag protectors. Motorcycles and motorbikes are provided with tubular crash bars and in most instances, saddlebag protectors are included to protect. the saddlebags and other installed equipment as well as the bike itself in the event a crash or dropping of the bike. These crash protectors are made of hollow steel tubular members and include a chrome plating thereover to improve their appearance. However, the chrome surface can easily be scratched, removing the chrome plating, exposing the steel tubing to air, resulting in rust marks where the scratches have occurred thus giving these components an ugly appearance. Applicant has provided a protective guard, made of high strength plastic material that conforms to the portion of the crash bar and saddlebag protector that comes in contact with the pavement when a bike is crashed or dropped for whatever reason, intentionally or unintentionally. The protectiveguard is a molded plastic hollow member with an inward facing slit. that allows it to be spread apart and opened at the slit thus allowing it to be forced over the crash bar or saddlebag protector and conveniently snapped into place as the protective guard returns to its original shape and held there without any additional securement. Removal of the device is accomplished by a reverse procedure whereby the slit is opened at either or both ends and pulled outward resulting in a quick removal process.

DESCRIPTION OF THE PRIOR ART

A prior art search of the U.S. Patent Office files in the appropriate areas revealed the following patents.

U.S. Pat. No. 4,136,890—issued to Vertucci on Jan. 30, 1979 and discloses a leg shield for motorcycles. As shown in FIG. 1, a shield is attached to the tubular crash bar by a plurality of spring type semicircular clamps. The purpose of the shield is to protect the feet, legs and thighs of the operator from the wind striking these body parts and keep them warm in cold weather.

U.S. Pat. No. 4,138,132—issued to Doyle on Feb. 6, 1979 and discloses a protective cover for the lower fork cases on the front of a motorcycle. The purpose of this cover is to protect the polished aluminum forks from chipping and pitting by flying objects and other impacts during use of the motorcycle. The cover is provided with holes through which the axle passes and is secured by nuts.

U.S. Pat. No. 4,403,787—issued to Shimano on Sep. 13, 1983 and discloses a covering apparatus for a handle bar of a bicycle that consists of a hollow body made of foam material and slips over the handle bar to provide a warm feel to the hands of the rider in cold weather.

U.S. Pat. No. 4,878,558—issued to Asakura on Nov. 7, 1989 and discloses in FIGS. 2 and 3 a protector which is attached to the front fork of a motorbike to protect it from the "strong impact forces of pebbles which are encountered during offroad running".

U.S. Pat. No. 5,106,136—issued to Crain on Apr. 21, 1992 and discloses a motoryele bumper system to protect the rider's legs in the event of a side impact in an automobile/motorcycle collision. The device consists of a plurality of circular bumpers that extend outwardly from each side of the motorcycle frame to protect the rider during a side impact collision.

U.S. Pat. No. 5,183,281—issued to Stephens on Feb. 2, 1993 and discloses an apparatus for protecting a vehicular frame element,i. e. the font fork of a bicycle. The apparatus comprises a pair of protective members that are attached to the legs of the fork by a plurality of standoffs to protect the frame member against denting and damaging by foreign elements during use.

In addition to the above cited prior art, other attempts have been made to solve this problem by wrapping the crash bar with pipe insulating foam or a garden hose and then securing the foam or hose with plastic bundling ties,friction tape or duct tape. However, these measures have not met with any success. The foam insulating material and garden hose is quickly destroyed, in some instances, after a single drop of the bike or scraping contact with the pavement and requires the entire installation procedure to be repeated in a time consuming manner bringing a halt to any skill improving exercises being undertaken.

As can be seen from the above discussion, although various types of protectors are known, there is presently no durable protective device for preventing scratches to the chrome surfaces of crash bars and saddlebag protectors which can easily be installed and removed without the use of any tools. It is urged that none of the above cited art, taken alone or in combination with each other, teach or suggest the subject matter of the invention disclosed and claimed hereinafter by applicant.

OBJECTS OF THE INVENTION

An object of the invention is to provide a protective guard for a crash bar and/or the saddlebag protector of a motorcycle or motorbike.

Another object of the invention is to provide a protective guard which is easily attached and removed without the need for any tools or changes to the motorcycle or motorbike.

A further object of the invention is to provide a protective guard which will prevent surface damage such as scratches and wear marks to motorcycle components when a motorcycle is dropped or comes in contact with the ground.

Yet another object of the invention is to provide a protective guard that will not damage the protective bars or interfere with a rider's riding style.

Another object of the invention is to provide a protective guard that is pre-molded and configured to conform to the shape of the particular motorcycle or motorbike protective devices.

A still further object of the invention is to provide a lightweight plastic that is highly durable, impact resistant and inexpensive protective guard that will not harm or damage the equipment they are installed on.

These and other objects of the invention will become more apparent hereinafter. The instant invention will now be described with particular reference to the accompanying drawings which form a part of this specification wherein like reference characters designate the corresponding arts throughout the several views.

BRIEF DESCRIPTION OF THE DRAWINGS

FIG. 1 is a perspective view of a motorcycle with the novel protective guards mounted thereon.

FIG. 2 is an enlarged view of the protective guard mounted on one of the crash bars illustrated in phantom.

FIG. 3 is a cross-sectional view taken along the plane 3—3 of FIG. 1, showing the relationship of the protective guard to the crash bar when mounted thereon.

DETAILED DESCRIPTION OF THE DRAWINGS

Referring to FIG. 1, there is shown a motorcycle 25 with a pair of crash bars 20 mounted on the forward end and extending from opposite sides of motorcycle 25. Also shown are a pair of the novel protective guards 10 mounted on the crash bars 20. As shown, protective guards 10 extend over a significant portion of the lower outer portion of crash bars 20 since this is the area which will first come into contact with the pavement in the event of a crash or drop of the bike 25. Additionally, there is shown one of the two saddlebags 15 that are mounted on the rear of the bike 25. These saddlebags 15 are also provided with protective bars 16 to protect the saddlebags 15 in a crash or drop of the bike 25 and are also provided with a protective guard 10. Saddlebag protective guard 10 is substantially the same as forward protective guard 10 which is mounted on crash bar 20, only smaller in size.

FIG. 2 is an enlarged view of a crash bar 20, shown in phantom, with a protective guard 10 mounted thereon. As shown, the uppermost vertical end 11 of guard 10 extends approximately to the vertical mid-point of crash bar 20 while the lower horizontal end 12 terminates short of the crash bar 10 connection to the bike 25. For purposes of illustration, protective guard 10 is shown pulled back slightly at the top to illustrate how slit 13 allows the protective guard 10 to be separated and placed over crash bar 20 and then return to its closed position, as illustrated in FIG. 3 to securely hold the protective guard 10 on crash bar 20.

The configuration of crash bar 10 and saddlebag protective bar 16 of FIGS. 1–3 are but one example of the crash protective components utilized. It is well known that there are many manufacturers of motorcycles and motorbikes and each manufacturer has their own styles and configurations of crash bars and saddlebag protectors, resulting in many different styles of crash bars and saddlebag protectors. As indicated above, the protective guard 10 is pre-molded to conform to the configuration of a particular manufacturer. Thus, it is intended that the novel protective guard 10 will be available in a variety of configurations to satisfy the needs of the many motorcyclists and motorbikers. It is further pointed out that the purpose of this invention is to provide a protective guard which can be readily attached and removed from a crash protective component of a motorcycle or motorbike regardless of the manufacturer.

FIG. 3 is a cross-sectional view taken along the plane 3—3 of FIG. 1. In this view, it is clearly illustrated how protective guard 10 surrounds crash bar 20 once it is installed. Protective guard 10 closely conforms to the outer circumference of crashbar 20 and maintains its position thereafter. Slit 13 is also shown in its closed condition relative to crash bar 20.

By way if review, it is pointed out that applicant has provided a protective guard 10 that is easily secured to protective bars 16 and 20 of a motorcycle or motorbike to protect the chrome finish of these components due to a drop of the bike or scraping contact with the pavement when the vehicle is in a lean-over position during a maneuver. As noted above, protective guards 10 are made of durable plastic material of sufficient wall thickness to withstand repeated impact of pavement contact. Applicant's device has been found to satisfy a solution to a problem which heretofore had not been addressed.

While the invention has been described in its preferred embodiment, it is to be understood that the words which have been used are words of description rather than words of limitation and that changes may be made within the purview of the appended claims without departing from the full scope or spirit of the invention.

Having thus described my invention, I claim:

1. In combination with a motorized two-wheeled vehicle having protective crash components comprising a pair of forward crash bars and a pair of saddle bag protective bars having a chrome finish surface thereon and removable protective guards for protecting said forward crash bars and said rear saddle bag protective bars, said protective guards comprising:

a premolded hollow tubular member having a first substantially vertically extending portion;

a second angularly disposed portion extending from said first portion and connected thereto by an integral angular portion;

said hollow tubular member having a slit extending the entire length of said pre-molded hollow tubular member whereby said slit can be spread apart, allowing said tubular member to be placed over the associated crash component to protect said chrome finish surface thereon whereby the first and second angularly disposed portions of the protective guard cooperate to securely hold guard in position when brought into engagement with the ground.

2. In combination with a motorized two-wheeled vehicle having protective crash components as defined in claim 1 wherein said crash component to be protected is a forward crash bar.

3. In combination with a motorized two-wheeled vehicle having protective crash components as defined in claim 1 wherein said crash component is a rear saddle bag protective bar.

4. In combination with a motorized two-wheeled vehicle having protective crash components as defined in claim 1 wherein said second angularly disposed portion is ninety degrees relative to said first vertically extending portion.

5. In combination with a motorized two-wheeled vehicle having protective crash components as defined in claim 1 wherein said second angularly disposed portion is greater than ninety degrees relative to said first substantially vertically extending portion.

6. In combination with a motorized two-wheeled vehicle having protective crash components as defined in claim 2 wherein said protective guards are made of high impact resistant plastic.

7. In combination with a motorized two-wheeled vehicle having protective crash components as defined in claim 6 wherein said motorized two-wheeled vehicle is a motorcycle.

8. In combination with a motorized vehicle having protective crash components as defined in claim 3 wherein said protective guards are made of high impact resistant plastic.

9. In combination with a motorized two-wheeled vehicle having protective crash components as defined in claim 8 wherein said motorized two-wheeled vehicle is a motorbike.

* * * * *